(12) United States Patent
Scherer et al.

(10) Patent No.: US 9,080,124 B2
(45) Date of Patent: Jul. 14, 2015

(54) USE OF GRAFT POLYMERS

(75) Inventors: Markus Scherer, Cologne (DE); Klaus Hedrich, Fischbachtal (DE); Alexander Dardin, Laudenbach (DE); Michael Mueller, Bensheim (DE); Torsten Stoehr, Frankfurt (DE); Boris Eisenberg, Heppenheim (DE)

(73) Assignee: EVONIK ROHMAX ADDITIVES GmbH, Darmstadt (DE)

( * ) Notice: Subject to any disclaimer, the term of this patent is extended or adjusted under 35 U.S.C. 154(b) by 1093 days.

(21) Appl. No.: 11/572,181

(22) PCT Filed: Jun. 23, 2005

(86) PCT No.: PCT/EP2005/006785
§ 371 (c)(1),
(2), (4) Date: Jan. 16, 2007

(87) PCT Pub. No.: WO2006/007934
PCT Pub. Date: Jan. 26, 2006

(65) Prior Publication Data
US 2007/0213237 A1 Sep. 13, 2007

(30) Foreign Application Priority Data
Jul. 16, 2004 (DE) .......................... 10 2004 034 618

(51) Int. Cl.
*C10M 149/10* (2006.01)
*C10M 149/02* (2006.01)
(Continued)

(52) U.S. Cl.
CPC ........... *C10M 149/10* (2013.01); *C10M 149/02* (2013.01); *C10M 161/00* (2013.01);
(Continued)

(58) Field of Classification Search
USPC ................................ 508/469, 466; 526/329.7
See application file for complete search history.

(56) References Cited

U.S. PATENT DOCUMENTS 3,067,163 A * 12/1962 La Verne ....................... 525/283
3,732,334 A * 5/1973 Ernst Koch et al. .......... 525/281
(Continued)

FOREIGN PATENT DOCUMENTS

DE             1 520 696       4/1969
DE     10 2004 018 093 A1    10/2005
(Continued)

OTHER PUBLICATIONS

U.S. Appl. No. 10/593,082, filed Sep. 15, 2006, Scherer, et al.
(Continued)

*Primary Examiner* — James Goloboy
(74) *Attorney, Agent, or Firm* — Oblon, McClelland, Maier & Neustadt, L.L.P.

(57) ABSTRACT

The invention relates to the use of graft polymers obtained by polymerization in two stages. In a first stage, at least one graft basis is produced by radically polymerizing a monomer composition A) containing 0 to 40 percent by weight of one or several ethylenically unsaturated ester compounds of formula (I), wherein R represents hydrogen or methyl, $R^1$ represents a linear or branched alkyl radical comprising 1 to 5 carbon atoms, $R^2$ and $R^3$ independently represent hydrogen or a group of formula —COOR', wherein R' represents hydrogen or an alkyl group comprising 1 to 5 carbon atoms, 60 to 100 percent by weight of one or several ethylenically unsaturated ester compounds of formula (II), wherein R represents hydrogen or methyl, $R^4$ represents a linear or branched alkyl radical comprising 6 to 40 carbon atoms, $R^5$ and $R^6$ independently represent hydrogen or a group of formula —COOR', wherein R' represents hydrogen or an alkyl group comprising 6 to 40 carbon atoms, and 0 to 40 percent by weight of comonomers, the percentages being relative to the weight of monomer composition A). In a second stage, a monomer composition B) containing 20 to 100 percent by weight of at least one monomer that comprises at least one nitrogen-containing group is grafted onto the graft basis in order to reduce wear in lubricant oil compositions. Said graft polymer comprises a maximum of 200 ppm of sulfur while the weight ratio between monomer composition A) and monomer composition B) ranges between 99.7:0.3 and 80:20.

20 Claims, 1 Drawing Sheet

(51) Int. Cl.
*C08L 51/06* (2006.01)
*C10M 161/00* (2006.01)

(52) U.S. Cl.
CPC ......... *C08L 51/06* (2013.01); *C10M 2209/084* (2013.01); *C10M 2217/02* (2013.01); *C10M 2217/028* (2013.01); *C10N 2220/021* (2013.01); *C10N 2220/022* (2013.01); *C10N 2230/02* (2013.01); *C10N 2230/04* (2013.01); *C10N 2230/06* (2013.01); *C10N 2230/43* (2013.01); *C10N 2240/04* (2013.01); *C10N 2240/08* (2013.01); *C10N 2240/10* (2013.01)

(56) References Cited

U.S. PATENT DOCUMENTS

| | | | | |
|---|---|---|---|---|
| 3,855,135 | A | * | 12/1974 | Newingham et al. ......... 508/297 |
| 4,618,439 | A | * | 10/1986 | Brandi et al. ................. 508/258 |
| 6,080,794 | A | | 6/2000 | Auschra et al. |
| 6,096,173 | A | | 8/2000 | Von Hippel et al. |
| 6,271,184 | B1 | * | 8/2001 | Seebauer et al. ............. 508/469 |
| 6,409,778 | B1 | | 6/2002 | Auschra et al. |
| 6,458,750 | B1 | | 10/2002 | Dardin et al. |
| 6,639,099 | B1 | | 10/2003 | Knebel et al. |
| 7,235,298 | B2 | | 6/2007 | Katusic et al. |
| 7,288,501 | B2 | | 10/2007 | Auer et al. |
| 7,374,743 | B2 | | 5/2008 | Katusic et al. |
| 7,525,788 | B2 | | 4/2009 | Hoerpel et al. |
| 2001/0036437 | A1 | | 11/2001 | Gutsch et al. |
| 2001/0055639 | A1 | | 12/2001 | Moritz et al. |
| 2002/0032293 | A1 | | 3/2002 | Bryant et al. |
| 2003/0206854 | A1 | | 11/2003 | Gutsch et al. |
| 2005/0148749 | A1 | | 7/2005 | Scherer et al. |
| 2005/0221192 | A1 | | 10/2005 | Hennige et al. |
| 2005/0239937 | A1 | | 10/2005 | Scherer et al. |
| 2005/0245406 | A1 | | 11/2005 | Scherer et al. |
| 2005/0261143 | A1 | | 11/2005 | Scherer et al. |
| 2005/0267239 | A1 | | 12/2005 | Scherer |
| 2006/0142168 | A1 | | 6/2006 | Kinker et al. |
| 2006/0189490 | A1 | | 8/2006 | Dardin et al. |
| 2006/0240999 | A1 | | 10/2006 | Placek et al. |
| 2007/0175362 | A1 | | 8/2007 | Gutsch et al. |
| 2007/0184993 | A1 | | 8/2007 | Scherer et al. |
| 2007/0254178 | A1 | | 11/2007 | Nun |
| 2008/0020190 | A1 | | 1/2008 | Nun et al. |
| 2008/0032197 | A1 | | 2/2008 | Horpel et al. |
| 2008/0084686 | A1 | | 4/2008 | Gutsch et al. |
| 2008/0138700 | A1 | | 6/2008 | Horpel et al. |
| 2008/0194861 | A1 | | 8/2008 | Schmitt et al. |
| 2008/0280050 | A1 | | 11/2008 | Nun et al. |
| 2008/0283171 | A1 | | 11/2008 | Nun et al. |
| 2008/0300373 | A1 | | 12/2008 | Schmitt et al. |
| 2008/0305702 | A1 | | 12/2008 | Nun et al. |
| 2009/0048406 | A1 | | 2/2009 | Iroff et al. |
| 2009/0078485 | A1 | | 3/2009 | Gutsch et al. |
| 2010/0000079 | A1 | | 1/2010 | Horpel et al. |
| 2010/0003401 | A1 | | 1/2010 | Horpel et al. |

FOREIGN PATENT DOCUMENTS

| | | |
|---|---|---|
| EP | 0 672 692 | 9/1995 |
| GB | 1068283 | 5/1967 |
| JP | 51-20237 | 6/1976 |
| JP | 53-2883 | 2/1978 |
| JP | 7-228642 | 8/1995 |
| JP | 9-3131 | 1/1997 |
| ME | PA05010258 A | 11/2005 |
| WO | 2004 087850 | 10/2004 |

OTHER PUBLICATIONS

U.S. Appl. No. 11/547,612, filed Oct. 4, 2006, Scherer, et al.
U.S. Appl. No. 12/306,019, filed Dec. 22, 2008, Boehmke, et al.
U.S. Appl. No. 10/592,363, filed Sep. 11, 2006, Scherer, et al.
U.S. Appl. No. 11/572,330, filed Jan. 19, 2007, Acker, et al.
U.S. Appl. No. 11/587,988, filed Oct. 30, 2006, Fischer, et al.
U.S. Appl. No. 11/995,949, filed Jan. 17, 2008, Stoehr, et al.
U.S. Appl. No. 11/815,624, filed Aug. 6, 2007, Mueller, et al.
U.S. Appl. No. 11/909,171, filed Sep. 20, 2007, Stoehr, et al.
U.S. Appl. No. 12/279,732, filed Aug. 18, 2008, Stoehr, et al.
U.S. Appl. No. 12/668,209, filed Jan. 8, 2010, Stoehr, et al.
U.S. Appl. No. 61/186,744, filed Jun. 12, 2009, Radano, et al.
U.S. Appl. No. 12/672,231, filed Feb. 4, 2010, Stoehr, et al.
U.S. Appl. No. 60/021,600, filed Jul. 11, 1996, Riemenschneider, et al.
U.S. Appl. No. 08/842,775, filed Apr. 17, 1997, Riemenschneider, et al.
U.S. Appl. No. 09/441,439, filed Nov. 17, 1999, Barthold, et al.
U.S. Appl. No. 60/194,367, filed Apr. 4, 2002, Michael, et al.
U.S. Appl. No. 12/746,683, filed Jun. 7, 2010, Hedrich, et al.
U.S. Appl. No. 13/202,744, filed Aug. 22, 2011, Eisenberg, et al.
U.S. Appl. No. 13/255,218, filed Sep. 7, 2011, Eisenberg, et al.
U.S. Appl. No. 61/421,867, filed Dec. 10, 2010, Radano, et al.
U.S. Appl. No. 61/408,274, filed Oct. 29, 2010, Neveu, et al.
U.S. Appl. No. 61/421,870, filed Dec. 10, 2010, Radano.
Office Action issued Sep. 9, 2011, in Japanese Patent Application No. 2007-520692 (Submitting English translation only).
U.S. Appl. No. 13/213,547, filed Aug. 19, 2011, Mueller, et al.
U.S. Appl. No. 13/318,492, filed Nov. 2, 2011, Radano, et al.
U.S. Appl. No. 61/393,076, filed Oct. 14, 2010, Langston, et al.
U.S. Appl. No. 61/527,800, filed Aug. 26, 2011, McElwain, et al.
U.S. Appl. No. 61/421,876, filed Dec. 10, 2010, Radano.
Canadian Office Action issued Apr. 5, 2012 in patent application No. 2,571,714.
Canadian Office Action Issued Jan. 14, 2013 in Patent Application No. 2,571,714.
German Office Action issued Jun. 13, 2012 in patent application No. 10 2004 034 618.6.
Office Action issued Oct. 9, 2013 in Canadian Patent Application No. 2,571,714.
Office Action issued Jun. 13, 2014 in Canadian Patent Application No. 2,571,714.

* cited by examiner

USE OF GRAFT POLYMERS

The present invention relates to the use of graft copolymers.

According to the present state of the art, crankshaft drive, piston group, cylinder bore and the valve control system of an internal combustion engine are lubricated with a motor oil. This is done by delivering the motor oil which collects in the oil sump of the engine by means of a delivery pump via an oil filter to the individual lubrication sites (pressure circulation lubrication in conjunction with injection and oil-mist lubrication).

In this system, the motor oil has the functions of: transmitting forces, reducing friction, reducing wear, cooling the components and gas sealing of the piston.

The oil is supplied under pressure to the bearing points (crankshaft, piston rod and camshaft bearings). The lubrication sites of the valve drive, the piston group gears and chains are supplied with injected oil, spin-off oil or oil mist.

At the individual lubrication sites, forces to be transmitted, contact geometry, lubrication rate and temperature vary within wide ranges in operation.

The increase in the power density of the engines (kW/capacity and torque/capacity) leads to higher component temperatures and surface pressures of the lubrication sites.

To ensure the motor oil functions under these operating conditions, the engine manufacturers require proof of the performance of a motor oil in the form of test results of standardized test methods and engine tests (for example API classification in the USA or ACEA test sequences in Europe). In addition test methods self-defined by individual manufacturers are used before a motor oil is approved for use.

Testing in passenger vehicle and truck engines customary on the market ensures that wear phenomena caused by motor oil are recognized before approval is granted.

Among the abovementioned lubricant oil properties, the wear protection of the motor oil is of particular significance. As an example, the requirement list of the ACEA test sequences 2002 shows that, in each category (A for passenger vehicle gasoline engines, B for passenger vehicle diesel engines and E for truck engines) with a separate engine test, sufficient wear protection for the valve drive is to be confirmed.

As mentioned above the approval processes of individual manufacturers include additional further engine tests with their own engines and test programs for assessing the wear performance.

Wear-reducing additives are known from the prior art. However, such additives are expensive and some of them have compatibility problems. Such additives are usually phosphorus- and/or sulfur-containing. In this context, it should be taken into account that there is a drive within the lubricant industry to reduce the phosphorus and sulfur input in modern lubricant oil formulations. This has both technical (avoidance of exhaust gas catalytic converter poisoning) and environmental policy reasons. The search for phosphorus and sulfur-free lubricant additives has thus become, specifically in the recent past, an intensive research activity of many additive manufacturers.

The article "The contribution of new dispersant mixed polymers to the economy of engine oils" (Pennewiss, Auschra) published in Lubrication Science (1996, 8, 179-197) discusses the advantageous effects of additives composed of ethylene-propylene copolymers and methacrylates, which contain partly ethoxylated side chains. Effects of this chemistry on dispersant action in motor oils are indicated. Advantages in the wear behavior are likewise described. The systems used have to be prepared in relatively complicated dispersion processes.

NL 6505344 (Oct. 20, 1966) of Shell describes a synergistic mode of action of oil-soluble polymers with typical wear-reducing additive types, for example dispersed calcium salts or hydroxides.

U.S. Pat. No. 3,153,640 (Oct. 20, 1964) of Shell includes copolymers consisting of two parts of methacrylate monomers and one part of NVP. They are not graft copolymers. The advantageous influence on wear in lubricant applications is mentioned. However, the improvement is relatively limited. This is the case especially taking account of the high content of expensive comonomers, for example N-vinylpyrrolidone (NVP).

JP 05271331 (Nippon Oil) describes VI and wear-improving polymers prepared from copolymers of α-olefins and maleic acid which are subsequently functionalized. The abstract cites friction and wear results which have been obtained in the Falex test (block-on-ring).

E. H. Okrent states in ASLE Transactions (1961, 4, 97-108), that polyisobutylenes or PAMA polymers used as VI improvers having influence on the wear performance in the engine. No conclusions are made about the chemistry used and the specific composition of the polymers. Wear-reducing action is accounted for merely with viscoelastic effects of polymer-containing oils. For example, no differences were found in influence on wear between PAMA- and PIB-containing oils.

Literature publications by Neudörfl and Schödel (Schmierungstechnik 1976, 7, 240-243; SAE Paper 760269; SAE Paper 700054; Die Angewandte Makromolekulare Chemie 1970, 2, 175-188) emphasize in particular the of the polymer concentration the engine wear. Reference is made to the abovementioned article by E. H. Okrent and, in analogy to Okrent, a wear-reducing action is not connected with the chemistry of the polymer. Generally, it is concluded that viscosity index improvers of relatively low molecular weight bring improved wear results. One publication additionally also discusses wear as a function of the HT/HS properties.

Like Neudörfl and Schödel, K. Yoshida (Tribology Transactions 1990, 33, 229-237) ascribes merely viscometric aspects to effects of polymers on the wear performance, Advantageous effects are explained by the preferential tendency to elastohydrodynamic film formation.

EP 164807 (Dec. 18, 1985) of Agip describes a multifunctional VI improver with dispersant, detergent and low-temperature action. Additionally mentioned, but not in the focus of this invention, is a wear-reducing action which is attributed, if anything, to advantages in the corrosion behavior, i.e. to an indirect influence on wear. The composition comprises the VI improver which comprises specific sulfur-containing units. The wear-reducing action of sulfur compounds is known. However, the use of sulfur compounds is associated with disadvantages, so that there are efforts to avoid the use of such compounds (cf. Lubricants and Lubrication, Wiley-VCH 2001, T. Mang and W. Dresel, p. 191).

In view of the prior art, it is thus an object of the present invention to provide highly active wear-reducing additives which have a low content of undesired substances, for example phosphorus and/or sulfur, the same time, the additives should overall have high environmental or compatibility.

In addition, it is consequently an object of the present invention to provide additives with wear-reducing action which can be prepared particularly inexpensively.

Furthermore, it is an object of the present invention to provide additives which stability against oxidation and thermal stress and also high shear resistance. Furthermore, the additives should be soluble in large amounts even in very nonpolar lubricant oils, for example in fully synthetic oils.

In addition it is an object of the present invention to provide additives which, in addition to wear-reducing action, additionally improve the flow properties of the lubricant oils, i.e. have viscosity index-improving action.

These and also further objects which are not stated explicitly but which can be derived or discerned from the connections discussed herein by way of introduction are achieved by a use with all features of claim 1. Appropriate modifications of the inventive use are protected in the claims referring back to claim 1.

By using graft copolymers obtainable by a two-stage polymerization, at least one graft base being prepared in a first stage by free-radically polymerizing a monomer composition A) which contains from 0 to 40% by weight, based on the weight of the monomer composition A), of one or more ethylenically unsaturated ester compounds of the formula (I)

(I)

where R is hydrogen or methyl, $R^1$ is a linear or branched alkyl radical having from 1 to 5 carbon atoms, $R^2$ and $R^3$ are each independently hydrogen or a group of the formula —COOR' where R' is hydrogen or an alkyl group having from 1 to 5 carbon atoms, from 60 to 100% by weight, based on the weight of the monomer composition A), of one or more ethylenically unsaturated ester compounds of the formula (II)

(II)

where R is hydrogen or methyl, $R^4$ is a linear or branched alkyl radical having from 6 to 40 carbon atoms, $R^5$ and $R^6$ are each independently hydrogen or a group of the formula —COOR" where R" is hydrogen or an alkyl group having from 6 to 40 carbon atoms, and from 0 to 40% by weight, based on the weight of the monomer composition A), of comonomers, and a monomer composition B) which includes from 20 to 100% by weight of at least one monomer having at least one nitrogen-containing group being grafted in a second stage onto the graft base, in which the graft copolymer comprises at most 200 ppm of sulfur and the ratio of the weight of the monomer composition A) to the weight of the monomer composition B) is in the range from 99.7:0.3 to 80:20, for reducing wear in lubricant oil compositions, additives are provided which can be prepared particularly inexpensively.

At the same time, a series of further advantages can be achieved by the inventive lubricant composition. These include: the additives to be used in accordance with the present invention exhibit high stability against oxidation and thermal stress and high shear resistance.

The inventive use provides additives for wear reduction which are soluble in large amounts in very nonpolar lubricant oils, for example in fully synthetic oils. At the same time, the additives exhibit high compatibility with lubricant oils.

As a consequence of the inventive use, additives are provided which, in addition to wear-reducing action, additionally improve the flow properties of the lubricant oils, i.e. have viscosity index-improving action.

In addition, the inventive use of the additive in many cases reduces the energy consumption.

Graft copolymers which are used for wear reduction in accordance with the invention may be obtained by a polymerization which comprises at least two steps.

In a first step, at least one graft base can typically be obtained, onto which a graft is grafted in at least one second step.

In the context of the present invention, the term graft base refers to at least one polymer onto which side chain polymers can be grafted. The graft base is in many cases also referred to as main chain polymer, backbone polymer or graft substrate.

In a first step a mono mer composition A) which comprises from 0 to 40% by weight, preferably from 0.1 to 35 and more preferably from 1 to 20% by weight, based on the weight of the monomer composition A), of one or more ethylenically unsaturated ester compounds of the formula (I)

(I)

where R is hydrogen or methyl, $R^1$ is a linear or branched alkyl radical having from 1 to 5 carbon atoms, $R^2$ and $R^3$ are each independently hydrogen or a group of the formula —COOR' where R' is hydrogen or an alkyl group having from 1 to 5 carbon atoms from 60 to 100% by weight, preferably from 65 to 99.9 and more preferably from 80 to 99% by weight, based on the weight of the monomer composition A), of one or more ethylenically unsaturated ester compounds of the formula (II)

(II)

where R is hydrogen or ethyl, $R^4$ is a linear or branched alkyl radical having from 6 to 40 carbon atoms, $R^5$ and $R^6$ are each independently hydrogen or a group of the formula —COOR" where R" is hydrogen or an alkyl group having from 6 to 40 carbon atoms, and from 0 to 40% by weight, based on the weight of the monomer composition A), of comonomers may be free-radically polymerized.

Monomer compositions for preparing the graft base comprise one or more ethylenically unsaturated ester compounds of the formula (I)

where R is hydrogen or methyl, $R^1$ is a linear or branched alkyl radical having from 1 to 5 carbon atoms, $R^2$ and $R^3$ are each independently hydrogen or a group of the formula —COOR' where R' is hydrogen or an alkyl group having from 1 to 5 carbon atoms.

Examples of component a) include
(meth)acrylates, fumarates and maleates which derive from saturated alcohols, such as methyl(meth)acrylate, ethyl (meth)acrylate, n-propyl (meth)acrylate isopropyl(meth) acrylate, n-butyl(meth)acrylate, tert-butyl (meth)acrylate and pentyl(meth)acrylate;
cycloalkyl(meth)acrylates such as cyclopentyl(meth)acrylate;
(meth)acrylates which derive from unsaturated alcohols, such as 2-propynyl(meth)acrylate, allyl(meth)acrylate and vinyl(meth)acrylate.

When the expression (meth)acrylates is used in the context of the present application, this term in each case encompasses methacrylates or acrylates alone, or else mixtures of the two.

As a further constituent, the compositions to be polymerized to prepare preferred graft bases contain from 60 to 100% by weight, in particular from 65 to 98% by weight and more preferably from 70 to 90% by weight, based on the weight of the monomer compositions for preparing the graft base, of one or more ethylenically unsaturated ester compounds of the formula (II)

where R is hydrogen or methyl, $R^4$ is a linear or branched alkyl radical having from 6 to 40 carbon atoms, p5 and $R^6$ are each independently hydrogen or a group of the formula —COOR" where R" is hydrogen or an alkyl group having from 6 to 40 carbon atoms.

These include
(meth)acrylates, fumarates and maleates which derive from saturated alcohols, such as hexyl(meth)acrylate, 2-ethylhexyl(meth)acrylate, heptyl (meth)acrylate, 2-tert-butylheptyl(meth)acrylate, octyl(meth)acrylate, 3-isopropylheptyl(meth)acrylate, nonyl(meth)acrylate, decyl (meth) acrylate, undecyl(meth)acrylate, 5-methylundecyl(meth) acrylate, dodecyl(meth)acrylate, 2-methyldodecyl(meth) acrylate, tridecyl(meth)-acrylate, 5-methyltridecyl(meth) acrylate, tetradecyl(meth)acrylate, pentadecyl(meth) acrylate, hexadecyl(meth)acrylate, 2-methylhexadecyl (meth)acrylate, heptadecyl(meth)acrylate, 5-isopropylheptadecyl (meth)acrylate, 4-tert-butyloctadecyl(meth) acrylate, 5-ethyloctadecyl (meth)acrylate, 3-isopropyloctadecyl(meth acrylate, octadecyl (meth)acrylate, nonadecyl(meth)acrylate, eicosyl(meth)acrylate, cetyleicosyl(meth)acrylate, stearyleicosyl(meth)acrylate, docosyl (meth)acrylate and/or eicosyltetratriacontyl(meth) acrylate; cycloalkyl(meth)acrylates such as 2,4,5-tri-t-butyl-3-vinylcyclohexyl (meth)acrylate, 2,3,4,5-tetra-t-butylcyclohexyl(meth)acrylate; (meth)acrylates which derive from unsaturated alcohols, for example oleyl (meth) acrylate;
cycloalkyl(meth)acrylates such as 3-vinylcyclohexyl(meth) acrylate, cyclohexyl(meth)acrylate, bornyl(meth)acrylate; and the corresponding fumarates and maleates.

The ester compounds having a long-chain alcohol radical, especially the compounds according to component (b), can be obtained, for example, by reacting (meth)acrylates, fumarates, maleates and/or the corresponding acids with long-chain fatty alcohols, which generally gives a mixture of esters, for example (meth)acrylates with various long-chain alcohol radicals. These fatty alcohols include Oxo Alcohol® 7911 and Oxo Alcohol® 7900, Oxo Alcohol® 1100 Alfol® 61, Alfol® 810, Lial® 125 and Nafol® types (Sasol Olefins & Surfactants GmbH); Alphanol® 79 (ICI) Epal® 610 and Epal® 810 (Ethyl Corporation); Linevol® 79, Linevol® 911 and Neodol® 25E (Shell A); Dehydad®, Hydrenol® and Lorol® types (Cognis); Acropol® 35 and Exxal® 10 (Exxon Chemicals GmbH); Kalcol 2465 Kao Chemicals).

Among the ethylenically unsaturated ester compounds, particular preference is given to the (meth)acrylates over the maleates and fumarates, i.e. $R^2$, $R^3$, $R^5$ and $R^6$ of the formulae (I) and (II) are each hydrogen in particularly preferred embodiments. In general, preference is given to the methacrylates over the acrylates.

In a particular aspect of the present invention, preference is given to using mixtures of long-chain alkyl(methacrylates according to the component of the formula (II), the mixtures comprising at least one (methacrylate having from 6 to 15 carbon atoms in the alcohol radical and at least one (meth) acrylate having from 16 to 40 carbon atoms in the alcohol radical.

The content of the (meth)acrylates having from 6 to 15 carbon atoms in the alcohol radical is preferably in the range from 20 to 95% by weight, based on the weight of the monomer composition for preparing the graft base. The content of the (meth)acrylates having from 16 to 40 carbon atoms in the alcohol radical is preferably in the range from 0.5 to 60% by weight based on the weight of the monomer composition for preparing the graft base.

In a further aspect of the present invention the content of olefinically unsaturated esters having from 8 to 14 carbon atoms is preferably greater than or equal to the content of olefinically unsaturated esters having from 16 to 18 carbon atoms.

Preferred mixtures for preparing preferred graft bases may additionally in particular comprise ethylenically unsaturated comonomers which can be copolymerized with the ethylenically unsaturated ester compounds of the formulae (I) and/or (II). The content of comonomers is preferably in the range from 0 to 40% by weight, in particular from 2 to 35% by weight and more preferably from 5 to 30% by weight based on the weight of the monomer compositions for preparing the graft base.

Comonomers which are particularly suitable in this context for the polymerization according to the present invention correspond to the formula:

in which $R^{1*}$ and $R^{2*}$ are each independently selected from the group consisting of hydrogen halogens, CN, linear or branched alkyl groups having from 1 to 20, preferably from 1 to 6 and more preferably from 1 to 4, carbon atoms which may be substituted by from 1 to $(2n+1)$ halogen atoms, where n is the number of carbon atoms of the alkyl group (for example $CF_3$), α,β-unsaturated linear or branched alkenyl or alkynyl groups having from 2 to 10, preferably from 2 to 6 and more preferably from 2 to 4, carbon atoms which may be substituted by from 1 to $(2n-1)$ halogen atoms, preferably chlorine, where n is the number of carbon atoms of the alkyl group, for example $CH_2=CCl-$, cycloalkyl groups having from 3 to 8 carbon atoms which may be substituted by from 1 to $(2n-1)$ halogen atoms, preferably chlorine, where n is the number of carbon atoms of the cycloalkyl group; aryl groups having from 6 to 24 carbon atoms which may be substituted by from 1 to $(2n-1)$ halogen atoms, preferably chlorine, and/or alkyl groups having from 1 to 6 carbon atoms, where n is the number of carbon atoms of the aryl group; $C(=Y)R^5$, $C(=Y^*)NR^{6*}R^{7*}$, $Y^*C(=Y^*)R^{5*}$, $SOR^{5*}$, $SO_2R^{5*}$, $SO_2k^{5*}NR^8SO_2R^5$, $PR^{5*}{}_2$, $P(=Y^*)R^{5*}{}_2$, $Y^*PR^{5*}{}_2$, $P(=Y^*)R^{5*}{}_2$, $NR^{8*}{}_2$ which may be quaternized with an additional $R^{8*}$, aryl or heterocyclyl group, where Y may be $NR^{8*}$, S or O, preferably O; $R^{5*}$ is an alkyl group having from 1 to 20 carbon atoms, an alkylthio having from 1 to 20 carbon atoms, $OR^{15}$ ($R^{15}$ is hydrogen or an alkali metal), alkoxy of from 1 to 20 carbon atoms, aryloxy or hetero-cyclyloxy; $R^{6*}$ and $R^{7*}$ are each independently hydrogen or an alkyl group having from 1 to 20 carbon atoms, or $R^{6*}$ and $R^{7*}$ together may form an alkylene group having from 2 to 7, preferably from 2 to 5 carbon atoms, in which case they form a 3- to 8-membered, preferably 3- to 6-membered, ring, and $R^8$ is hydrogen, linear or branched alkyl or aryl groups having from 1 to 20 carbon atoms;

$R^{3*}$ and $R^{4*}$ are independently selected from the group consisting of hydrogen, halogen (preferably fluorine or chlorine), alkyl groups having from 1 to 6 carbon atoms and $COOR^{9*}$ in which $R^{9*}$ is hydrogen, an alkali metal or an alkyl group having from 1 to 40 carbon atoms, or $R^{3*}$ and $R^{4*}$ together may form a group of the formula $(CH_2)_{n'}$, which may be substituted by from 1 to $2n'$ halogen atoms or $C_1$ to $C_4$ alkyl groups, or form the formula $C(=O)-Y^*-C(=O)$ where n' is from 2 to 6, preferably 3 or 4, and $Y^*$ is as defined above; and where at least 2 of the $R^{1*}$, $R^{2*}$, $R^{3*}$ and $R_4^*$ radicals are hydrogen or halogen.

Preferred comonomers which may be present in the monomer compositions A) include nitrogen bearing monomers, in which case these correspond to those present in the monomer composition B).

The preferred comonomers include vinyl halides, for example vinyl chloride vinyl fluoride vinylidene chloride and vinylidene fluoride;

vinyl esters such as vinyl acetate;

styrene substituted styrenes having an alkyl substituent in the side chain for example α-methylstyrene and α-ethylstyrene, substituted styrenes having an alkyl substituent on the ring such as vinyltoluene and p-methylstyrene halogenated styrenes, for example monochlorostyrenes dichlorostyrenes, tribromostyrenes and tetrabromostyrenes;

heterocyclic vinyl compounds such as 2-vinyl pyridine 3-vinylpyridine 2-methyl-5-vinylpyridine, 3-ethyl-4-vinylpyridine, 2,3-dimethyl-5-vinylpyridine vinylpyrimidine, vinylpiperidine, 9-vinylcarbazole 3-vinyl-carbazole 4-vinylcarbazole, 1-vinylimidazol, 2-methyl-1-vinylimidazole N-vinyl pyrrolidone 2-vinylpyrrolidone, N-vinylpyrrolidine, 3-vinylpyrrolidine N-vinylcaprolactam, N-vinylbutyrolactam, vinyloxolane, vinylfuran, vinyloxazoles and hydrogenated vinyloxazoles, vinyl and isoprenyl ethers;

maleic acid and maleic acid derivatives, for example maleic anhydride, methylmaleic anhydride, maleimide, methylmaleimide;

fumaric acid and fumaric acid derivatives;

acrylic acid and methacrylic acid;

dienes, for example divinylbenzene;

aryl(meth)acrylates such as benzyl, methacrylate or phenyl methacrylate, where the aryl radicals may each be unsubstituted or up to tetrasubstituted;

methacrylates of halogenated alcohols, such as 2,3-dibromopropyl methacylate, 4-bromophenyl methacrylate, 1,3-dichloro-2-propyl methacrylate, 2-bromoethyl, ethacrylate.

2-iodoethyl methacrylate, chloromethyl methacrylate;

hydroxyalkyl(meth)acrylates such as 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol (meth)acrylate, carbonyl-containing methacrylates such as 2-carboxyethyl methacrylate, carboxymethyl methacrylate, oxazolidinylethyl methacrylate, N-(methacryloyloxy)formamide, acetonyl methacrylate, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone, N-(2-methacryloyloxypentadecyl)-2-pyrrolidinone, N-(3-methacryloyloxyheptadecyl)-2-pyrrolidinone;

glycol dimethacrylates such as 1,4-butanediol methacrylate, 2-butoxyethyl methacrylate, 2-ethoxyethoxymethyl methacrylate, 2-ethoxyethyl methacrylate;

methacrylates of ether alcohols, such as tetrahydrofurfuryl methacrylate;

vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate and ethoxylated (meth)acrylates which have preferably from 1 to 20, in particular from 2 to 8, ethoxy groups;

aminoalkyl (meth)acrylates and aminoalkyl (meth) acrylamides, such as

N-(3-dimethylaminopropyl)methacrylamide,
dimethylaminopropyl methacrylate,
3-diethylaminopentyl methacrylate,
3-dibutylaminohexadecyl (meth)acrylate, nitriles of (meth)acrylic acid and other nitrogen-containing methacrylates, such as N-(methacryloyloxyethyl)diisobutyl ketimine,
N-(methacryloyloxyethyl)dihexadecyl ketimine,
methacryloylamidoacetonitrile,
2-methacryloyloxyethylmethylcyanamide,
cyanomethyl methacrylate;

heterocyclic (meth)acrylates such as 2-(1-imidazolyl)ethyl(meth)acrylate, 2-(4-morpholinyl)ethyl(meth)acrylate and 1-(2-methacryloyloxyethyl)-2-pyrrolidone;

oxiranyl methacrylates such as
2,3-epoxybutyl methacrylate,
3,4-epoxybutyl methacrylate,
10,11-epoxyundecyl methacrylate,
2,3-epoxycyclohexyl methacrylate,
10,11-epoxyhexadecyl methacrylate;
glycidyl methacrylate.

These monomers may be used individually or as a mixture.

The graft base preferably has a specific viscosity $\eta_{sp/c}$ measured in chloroform at 25° C. in the range from 4 to 60 ml/g, more preferably in the range from 5 to 40 ml/g, measured to ISO 1628-6.

The weight-average molecular weight of the graft base is generally less than or equal to 600 000 g/mol preferably less than or equal to 400 000 g/mol. The weight-average molecular weight of the graft base is preferably in the range from 5000 to 200 000 g/mol, in particular from 6000 to 100 000 g/mol.

The preferred graft bases which can be obtained by polymerizing unsaturated ester compounds preferably have a polydispersity $M_w/M_n$ in the range from 1.1 to 10.0, in particular from 1.2 to 7.0 and more preferably from 1.3 to 5.0.

The molecular weight and the polydispersity can be determined by known methods. For example, gel permeation chromatography (GPC) can be used. It is equally possible to use an osmometric process, for example vapor phase osmometry, to determine the molecular weights. The processes mentioned are, for example, described in P.J. Flory, "Principles of Polymer Chemistry" Cornell University Press (1953), Chapter VII, 266-316 and "Macromolecules, an Introduction to Polymer Science", F.A. Bovey and F. H. Winslow, Editors, Academic Press(1979), 296-312 and W. W. Yau, J. J. Kirkland and D. D. Bly, "Modern Size Exclusion Liquid Chromatography, John Wiley and Sons, New York, 1979. To determine the molecular weights of the polymers presented herein, preference is given to using gel permeation chromatography. Measurement should preferably be made against polymethacrylate or polyacrylate standards.

Customary free-radical polymerization is described, inter alia, in Ullmann's Encyclopedia of Industrial Chemistry, Sixth Edition. In general, a polymerization inhibitor and a chain transferee are used for this purpose. The usable initiators include the azo initiators widely known in the technical field, such as AIBN and 1,1-azobiscyclohexanecarbonitrile, and also peroxy compounds such as methyl ethyl ketone peroxide, acetyl-acetone peroxide, dilauryl peroxide, tert-butyl per-2-ethylhexanoate, ketone peroxide, tert-butyl per-octoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)-cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the aforementioned compounds with one another, and mixtures of the aforementioned compounds with compounds which have not been mentioned but can likewise form free radicals.

Suitable chain transferers are in particular sulfur-free compounds which are known per se. These include, for example, without any intention that this should impose a restriction, dimeric α-ethylstyrene(2,4-diphenyl-4-methyl-1-pentene), enol ethers of aliphatic and/or cycloaliphatic aldehydes, terpenes, α-terpinene, terpinols, 1,4-cyclohexadiene, 1,4-dihydronaphthalene, 1,4,5,8-tetrahydronaphthalene, 2,5-dihydrofuran, 2,5-dimethylfuran and/or 3,6-dihydro-2H-pyran; preference is given to dimeric α-ethylstyrene.

These chain transferers are commercially available. They can also be prepared in the manner known to those skilled in the art. For instance, the preparation of dimeric α-methylstyrene is described in the patent DE 966 375. Enol ethers of aliphatic and/or cycloaliphatic aldehydes are disclosed in the patent DE 3 030 373. The preparation of terpenes is explained in EP 80 405. The published specifications JP 73/121 891 and JP 78/121 890 explain the preparation of α-terpinene, terpinols, 1,4-cyclohexadiene, 1,4-dihydronaphthalene, 1,4,5,8-tetrahydronaphthalene. The preparation of 2,5-dihydrofuran, 2,5-dimethylfuran and 3,6-dihydro-2H-pyran is explained in the published specification DE 2 502 283.

The polymerization of the graft base can be performed at standard pressure, reduced pressure or elevated pressure. The polymerization temperature too is uncritical. In general, however, it is in the range of −20°-200° C., preferably 0°-130° C. and more preferably 70°-120° C.

The polymerization can be performed with or without solvent. The term "solvent" is to be understood here in a wide sense.

Preference is given to performing the polymerization in a nonpolar solvent. These include hydrocarbon solvents, for example aromatic solvents such as toluene, benzene and xylene, saturated hydrocarbons, for example cyclohexane, heptane, octane, nonane, decane, dodecane, which may also be present in branched form. These solvents may be used individually or else as a mixture. Particularly preferred solvents are mineral oils, natural oils and synthetic oils, and mixtures thereof. Among these, mineral oils are most preferred.

The graft base can be prepared in one or more steps, and it is possible to use different monomer compositions A) which may differ, for example, in the content of comonomers. This allows mixtures of graft bases to be generated which can be used advantageously in accordance with the invention.

To prepare graft polymers from the composition obtained in step 1, which generally comprises at least one main chain polymer, at least one monomer composition B) is grafted.

It is assumed that the grafting forms side chains on the graft base, so that at east a portion of the graft is bonded covalently to the graft base.

The grafting can be effected in one or more steps. In this context, it is possible, inter alia, to change the composition of the monomer composition B). For example, different monomers having nitrogen-containing groups can be used.

In addition it is also possible in further stages to graft on compositions which contain only a small content of nitrogen-containing monomers, if any. Such graftings can be performed before or after the grafting with monomers which have nitrogen-containing groups.

The performance of graft copolymerizations is common knowledge and is detailed, for example, in Ullmann's Encyclopedia of Industrial Chemistry, Sixth Edition and Römpp Chemie-Lexikon on CD version 2.0, where reference is made to further literature.

The monomer composition B) comprises at least 20% by weight, preferably at least 50% by weight, in particular at least 70% by weight and more preferably from 90% by weight to 100% by weight, based on the weight of the monomer composition B), of at least one monomer having at least one nitrogen-containing group.

The ratio of the weight of the monomer composition A) to the weight of the monomer composition B) is in the range from 99.7:0.3 to 80:20, preferably in the range from 99.5:0.5 to 88:12, in particular in the range from 99:1 to 91:9 and more preferably in the range from 98:2 to 95:5.

In general, 0.3-12% by weight, in particular 1-9% by weight and preferably 2-5% by weight, based on the weight of the graft base of one or more monomers having at least one nitrogen-containing group may be grafted onto the graft base.

Monomers having at east one nitrogen-containing group are common knowledge. The nitrogen-containing groups preferably have dispersing action. In addition, preferred nitrogen-containing groups which are present in the monomers exhibit basic action. The $pK_b$ value of these bases is preferably in the range from 2 to 7, more preferably from 4 to 7.

Preferred groups are derived from primary, secondary or tertiary amines, saturated and/or unsaturated heterocyclic nitrogen compounds, for example pyridine, pyrimidine, piperidine, carbazole, imidazole, morpholine, pyrrole.

Preferred monomers having at least one nitrogen-containing group are compounds of the formula (III)

(III)

where $R^7$, $R^8$ and $R^9$ may each independently be hydrogen or an alkyl group having from 1 to 5 carbon atoms and $R^{10}$ is a group which contains from 1 to 100 carbon atoms and has at least one nitrogen atom. At least two of the $R^7$, $R^8$ and $R^9$ radicals are preferably hydrogen.

The $R^{10}$ radical is a group comprising from 1 to 100, in particular from 2 to 50, preferably from 2 to 20 carbon atoms. The expression "group containing from 1 to 100 carbon atoms" indicates radicals of organic compounds having from 1 to 100 carbon atoms. It includes aromatic and heteroaromatic groups, and alkyl, cycloalkyl, alkoxy, cycloalkoxy, alkenyl, alkanoyl, alkoxycarbonyl groups, and also heteroaliphatic groups. The groups mentioned may be branched or unbranched. In addition, these groups may have customary substituents. Substituents are, for example, linear and branched alkyl groups having from 1 to 6 carbon atoms, for example methyl, ethyl, propyl, butyl, pentyl, 2-methylbutyl or hexyl; cycloalkyl groups, for example cyclopentyl and cyclohexyl; aromatic groups such as phenyl or naphthyl; amino groups ether groups, ester groups and halides.

According to the invention, aromatic groups denote radicals of mono- or polycyclic aromatic compounds having preferably from 6 to 20, in particular from 6 to 12, carbon atoms. Heteroaromatic groups denote aryl radicals in which at least one CH group has been replaced by N and/or at least two adjacent CH groups have been replaced by S, NH or O, heteroaromatic groups having from 3 to 19 carbon atoms.

Aromatic or heteroaromatic groups preferred in accordance with the invention derive from benzene, naphthalene, biphenyl, diphenyl ether, diphenylmethane, diphenyldimethylmethane, bisphenone, furan, pyrrole, imidazole, isoxazole, pyrazole, 1,3,4-oxadiazole, 2,5-diphenyl-1,3,4-oxadiazole, 1,3,4-triazole, 2,5-diphenyl-1,3,4-triazole, 1,2,5-triphenyl-1,3,4-triazole, 1,2,4-oxadiazole, 1,2,4-triazole, 1,2,3-triazole, 1,2,3,4-tetrazole, benzofuran, indole, benzo[c]furan, isoindole, benzoxazole, benzimidazole, benzisoxazole, benzopyrazole, dibenzofuran, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazino-pyrimidine, carbazole, aciridine, phenazine, benzoquinoline, phenoxazine, acridizine, benzopteridine, phenanthroline and phenanthrene, each of which a also optionally be substituted.

The preferred alkyl groups include the methyl, ethyl, propyl, isopropyl, 1-butyl, 2-butyl, 2-methylpropyl, tert-butyl radical, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl and the eicosyl group.

The preferred cycloalkyl groups include the cyclopropyl, cyclobutyl, cyclopentyl, cyclohexyl, cycloheptyl and the cyclooctyl group, each of which is optionally substituted with branched or unbranched alkyl groups.

The preferred alkenyl groups include the vinyl, allyl, 2-methyl-2-propenyl, 2-butenyl, 2-penetenyl, 2-decenyl and the 2-eicosenyl group.

The preferred alkynyl groups include the ethynyl, propargyl, 2-methyl-2-propynyl, 2-butynyl, 2-pentynyl and the 2-decynyl group.

The preferred alkanoyl groups include the formyl, acetyl, propionyl, 2-methylpropionyl, butyryl, valeroyl, pivaloyl, hexanoyl, decanoyl and the dodecanoyl group.

The preferred alkoxycarbonyl groups include the methoxycarbonyl, ethoxycarbonyl, propoxycarbonyl, butoxycarbonyl, tert-butoxycarbonyl, hexyloxycarbonyl, 2-methylhexyloxycarbonyl, decyloxycarbonyl or dodecyloxycarbonyl group.

The preferred alkoxy groups include alkoxy groups whose hydrocarbon radical is one of the aforementioned preferred alkyl groups.

The preferred cycloalkoxy groups include cycloalkoxy groups whose hydrocarbon radical is one of the aforementioned preferred cycloalkyl groups.

The preferred heteroatoms which are present in the $R^{10}$ radical include oxygen and nitrogen.

In a particular aspect of the present invention, the $R^{10}$ group may be a —C(O)—X—$R^{11}$ group where X=oxygen or an amino group of the formula —NH— or —$NR^{12}$-where $R^{12}$ is an alkyl radical having from 1 to 40 carbon atoms and $R^{11}$ is a linear or branched alkyl radical which is substituted by at least one —$NR^{13}R^{14}$ group and has from 2 to 20, preferably from 2 to 6 carbon atoms, where $R^{13}$ and $R^{14}$ are each independently hydrogen, an alkyl radical having from 1 to 20 carbon atoms, preferably from 1 to 6 carbon atoms, or where $R^{13}$ and $R^{14}$, including the nitrogen atom and optionally a further nitrogen or oxygen atom, form a 5- or 6-membered ring which may optionally be substituted by $C_1$-$C_6$-alkyl.

In a further preferred embodiment, $R^{10}$ may be an —$NR^{15}C(=O)R^{16}$ group where $R^{15}$ and $R^{16}$ together form an alkylene group having from 2 to 6, preferably from 2 to 4 carbon atoms, to form a 4- to 8-membered, preferably 4- to 6-membered, saturated or unsaturated ring, if appropriate with inclusion of a further nitrogen or oxygen atom, where this ring may optionally also be substituted by $C_1$-$C_6$-alkyl.

In a third preferred embodiment, $R^{10}$ may be a group which is derived from the heteroaromatic or heterocyclic compounds detailed above. Preferred compounds in this context include pyridine, pyrimidine, piperidine, carbazole, imidazole, morpholine, pyrrole.

The ratio of nitrogen atoms to carbon atoms in the $R^{10}$ radical of the formula (III) may, in a particular aspect, be in the range from 1:1 to 1:20, preferably from 1:2 to 1:10.

The preferred monomers having at least one nitrogen-containing group include
aminoalkyl (meth)acrylates and aminoalkyl (meth) acrylamides such as
N-(3-dimethylaminopropyl)methacrylamide,
dimethylaminoethyl methacrylate,
dimethylaminopropyl methacrylate,
3-diethylaminopentyl methacrylate,
3-dibutylaminohexadecyl (meth)acrylate;
heterocyclic (meth)acrylates such as 2-(1-imidazolyl)ethyl (meth)acrylate, N-morpholinoethyl(meth)acrylate, especially 2-(4-morpholinyl)ethyl (meth)acrylate and 1-(2-methacryloyloxyethyl)-2-pyrrolidone;
heterocyclic vinyl compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinyl-carbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxazoles and hydrogenated vinyloxazoles.

These monomers may be used individually or as a mixture.

In addition, the monomer composition B) may comprise comonomers which can be copolymerized with the monomers having at least one nitrogen-containing group. These monomers correspond to the monomers which were detailed in relation to the monomer composition A). These monomers may be used individually or as a mixture.

For the grafting, a polymerization initiator is generally used, for which the initiators mentioned above for the preparation of the graft base may be used. Particular preference is given to using cumyl hydroperoxide, diisobutyl peroxide or tert-butyl perbenzoate.

The present invention provides additives for wear reduction without their having a high sulfur content. Thus, the sulfur content is at most 200 ppm, preferably at most 100 ppm and more preferably at most 5 ppm, based on the weight of the graft copolymer. The low content of sulfur can be achieved in particular by the use of sulfur-free components.

The grafting can be carried out under standard pressure, reduced pressure or elevated pressure. The polymerization temperature too is uncritical. In general, it is, however, in the range of −20-200° C., preferably 0°-160° C. and more preferably 110-140° C.

In a particular aspect of the present invention, the graft polymerization can be effected at a temperature which is higher than the temperature at which the graft base was formed. The temperature of the grafting is preferably higher by at least 5° C., preferably by at least 10° C. and more preferably by at least 20° C. than the temperature at which the graft base was formed.

In a particular aspect of the present invention, the graft yield is greater than or equal to $(x*10^{-5}$ mol/g+35)%, more preferably greater than or equal to $(x*10^{-5}$ mol/g+40)%, where x is the weight-average molecular weight of the graft base determined by GPC. At a weight-average molecular weight of 100 000, the graft yield is preferably greater than or equal to 36% and more preferably greater than or equal to 41%.

In a particular aspect of the present invention, the graft yield is greater than or equal to 35%, in particular greater than or equal to 45% and more The graft yield (PA) is defined as PA=$(M_{PG}-M_{Pf})/M_{PG}*100\%$ where $M_{PG}$ is the mass of the graft base and $M_{Pf}$ is the mass of remaining base polymer in the graft copolymer in one volume unit.

The mass of the graft base ($M_{PG}$) and the mass of the remaining base polymer in the graft copolymer ($M_{Pf}$) can be determined by HPLC chromatography (High Performance Liquid Chromatography) which is configured as adsorption chromatography.

For elution, the polarity of the solvent is varied. This can be achieved by changing the solvent composition. Preference is given to using a Hewlett Packard HP 1090 liquid chromatograph with a CN-functionalized silica gel column (Nucleosil CN-25 cm #N1224).

Figure 1:
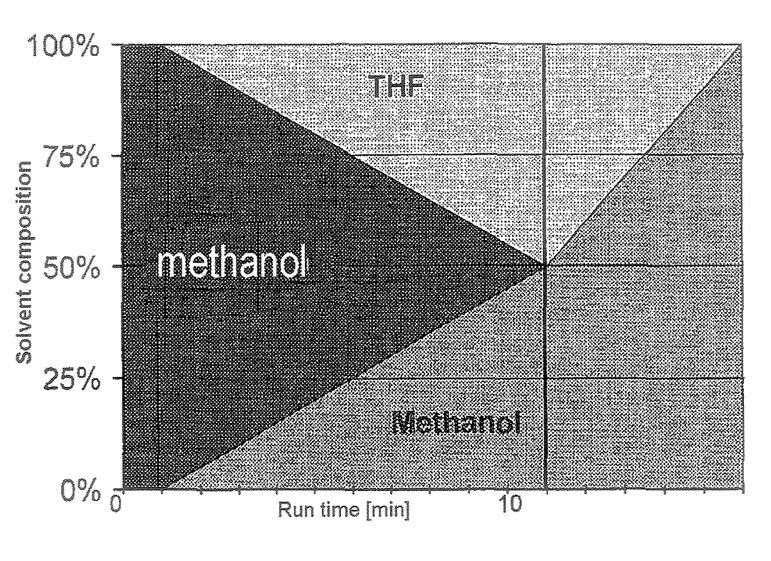
FIG. 1: A graph illustrating the variation of solvent composition during an elution that is effected over 15 minutes.

For elution, preference is given to using a solvent gradient. Elution can be effected over 15 minutes. In the first minute, pure isooctane is used. In the region from minute 1 to minute 11, the content of isooctane is reduced from 100% to 0% with constant gradient, while the content of tetrahydrofuran and methanol is increased from 0% to 50% in each case at constant gradient. In the region from minute 11 to minute 15, the content of methanol is increased from 50% to 100% while the content of tetrahydrofuran is reduced from 50% to 0%. The solvent composition used with preference for the elution can be taken from FIG. 1. The HPLC analysis is preferably performed at a flow rate of 1 ml/min at room temperature. The HPLC column can be supplied with a maximum loading, but it should be ensured that all of the polymer is bonded to the column. In HPLC, the graft base is generally eluted before the graft copolymer.

The polymers are detected preferably by the ELSD method (Evaporating Light Scattering Detector), which is known per se and has been described in the literature cited above. To convert the units measured to mass units a calibration function is required, which should preferably be effected immediately before or after the measurement in this case, an Alltech 2000 ELSD detector can be used.

As detailed above the graft yield is found from the equation $$PA=(M_{Pf}-M_{PG})/M_{Pf}$$

The mass of the graft copolymer ($M_{Pf}$) is calculated from the difference of the total mass of the polymer ($M_{Total}$) and the mass of the graft base $M_{PG}$ by the equation $M_{Pf}=M_{Total}-M_{PG}$.

The total mass of the polymer ($M_{Total}$) can be determined in a known manner, for example by weighing the polymer used for the analysis, or from the density, the proportion by weight and the volume of the polymer solution used for the analysis.

The mass of the graft base ($M_{PG}$) is calculated from $$M_{PG} = \left( \int_{t1}^{t2} mAU^* dt \right)^* f_{response}$$

where $$\int_{t1}^{t2} mAU^* dt$$

Peak area of the graft base in milliabsorbance units* seconds=mAU*s over the time period from t1 to t2, where t1 is the start and t2 is the end of the elution of graft base.

$f_{response}$: response factor, function in μg/mAU*s which is required response to convert the peak area to a mass which is obtained by means of a calibration curve.

The graft copolymer preferably has a specific viscosity $\eta_{sp/c}$ measured in chloroform at 25° C. in the range from 5 to 70 ml/g, more preferably in the range from 6 to 50 ml/g, measured to ISO 1628-6.

The ratio of the specific viscosity of the graft copolymer to the specific viscosity η of the graft base is preferably in the range from 1.01:1 to 1.30:1, in particular in the range from 1.10:1 to 1.20:1.

The weight-average molecular weight of the graft copolymer is preferably less than or equal to 600 000 g/mol, in particular less than or equal to 400 000 g/mol. More preferably, the weight-average molecular weight of the graft copolymer is in the range from 5100 to 250 000 g/mol, in particular from 6500 to 120 000 g/mol.

The ratio of the weight-average molecular weight of the graft copolymer to the weight-average molecular weight of the graft base is preferably in the range from 1.01:1 to 5:1, in particular in the range form 1.5:1 to 2:1.

Moreover, the graft copolymer is used in a lubricant oil composition. A lubricant oil composition comprises at least one lubricant oil.

The lubricant oils include in particular mineral oils, synthetic oils and natural oils.

Mineral oils are known per se and commercially available. They are generally obtained from petroleum or crude oil by distillation and/or refining and optionally further purification and finishing processes, the term mineral oil including in particular the higher-boiling fractions of crude oil or petroleum. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible, Mineral oils are also produced in a smaller proportion from raw materials of vegetable (for example from jojoba, rapeseed) or animal (for example neatsfoot oil) origin. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties is attributed. However, the assignment is difficult, since individual alkane molecules may have both long-chain branched groups and cycloalkane radicals, and aromatic parts. For the purposes of the present invention, the assignment can be effected to DIN 51 378, for example, Polar fractions can also be determined to ASTM D 2007.

The fraction of n-alkanes in preferred mineral oils is less than 3% by weight, the fraction of O-, N- and/or S-containing compounds less than 6% by weight. The fraction of the aromatics and of the mono-methyl-branched paraffins is generally in each case in the range from 0 to 40% by weight. In one interesting aspect, mineral oil comprises mainly naphthenic and paraffin-base alkanes which have generally more than 13, preferably more than 18 and most preferably more than 20 carbon atoms. The fraction of these compounds is generally ≥60% by weight, preferably 80% by weight, without any intention that this should impose a restriction. A preferred mineral oil contains from 0.5 to 30% by weight of aromatic fractions, from 15 to 40% by weight of naphthenic fractions, from 35 to 80% by weight of paraffin-base fractions, up to 3% by weight of n-alkanes and from 0.05 to 5% by weight of polar compounds, based in each case on the total weight of the mineral oil.

An analysis of particularly preferred mineral oils, which was effected by means of conventional processes such as urea separation and liquid chromatography on silica gel shows, for example, the following constituents, the percentages relating to the total weight of the particular mineral oil used:
n-alkanes having from approx. 18 to 31 carbon atoms:
0.7-1.0%,
slightly branched alkanes having from 18 to 31 carbon atoms:
1.0-8.0%,
aromatics having from 14 to 32 carbon atoms:
0.4-10.7%
iso- and cycloalkanes having from 20 to 32 carbon atoms:
60.7-82.4%,
polar compounds:
0.1-0.8%,
loss:
6.9-19.4%.

Valuable information with regard to the analysis of mineral oils and a list of mineral oils which have a different composition can be found, for example, in Ullmann's Encyclopedia of industrial Chemistry, 5th Edition on CD-ROM, 1997, under "lubricants and related products".

Synthetic oils include organic esters, for example diesters and polyesters, polyalkylene glycols, polyethers, synthetic hydrocarbons, especially polyolefins, among which preference is given to polyalphaolefins (PAO), silicone oils and perfluoroalkyl ethers. They are usually somewhat more expensive than the mineral oils, but have advantages with regard to their performance.

Natural oils are animal or vegetable oils, for example neatsfoot oils or jojoba oils.

These lubricant oils may also be used as mixtures and are in many cases commercially available.

The concentration of the graft copolymer in the lubricant oil composition is preferably in the range from 1 to 40% by weight, more preferably in the range form 2 to 20% by weight, based on the total weight of the composition.

In addition to the aforementioned components, a lubricant oil composition may comprise further additives.

These additives include antioxidants, corrosion inhibitors, antifoams, antiwear components, dyes, color stabilizers, detergents, pour point depressants, DI additives, friction modifiers and/or extreme pressure additives.

The graft copolymer may be used especially for reducing wear in internal combustion engines, gearboxes, clutches or pumps.

In a particular aspect of the present invention, the present use may lead to a mean cam wear of at most 40 μm, preferably at most 30 μm and more preferably at most 20 μm at 100 h, measured to CEC-L-51-A-98.

EXAMPLES

Methods and Test Methods Used:

In general, wear is determined in the engine by a component comparison before and after a wear test by measuring the cam shape. For the present invention, measurement was effected by test method CEC-L-51-A-98. This test method is suitable both for the analysis of the wear performance in a passenger vehicle diesel engine (ACEA category B) and in a truck diesel engine (ACEA category E).

In this test method, the circumferential profile of each cam is determined and compared in 1° steps on a 2- or 3-D measuring machine before and after the test. The profile deviation formed in the test corresponds to the cam wear. To assess the tested motor oil, the wear properties of the individual cams are averaged and compared with the limiting value of the appropriate ACEA categories.

In a departure from the CEC test method, the test time was shortened from 200 h to 100 h. After this test, the cam wear was determined. As early as after 100 h, clear differences could be detected in the wear between the formulations used.
Synthesis of the polymer used for Example 1 (Polymer Composition I)

A 2 liter four-neck flask equipped with saber stirrer (operated at 150 revolutions per minute), thermometer and reflux condenser was initially charged with 430 g of a 150N oil and 47.8 g of a monomer mixture consisting of C12-C18-alkyl methacrylates and methyl methacrylate (MMA) in a weight ratio of 99.0:1.0. The temperature is adjusted to 100° C. Thereafter, 0.71 g of tert-butyl peroctoate is added and, at the same time, a monomer feed consisting of 522.2 g of a mixture of C12-C18-alkyl methacrylates and methyl methacrylate in a weight ratio of 99.0:1.0 and also 3.92 g of tert-butyl peroctoate is started. The feed time is 3.5 hours and the feed rate is uniform. Two hours after the end of feeding, another 1.14 g of tert-butyl peroctoate are added. The total reaction time is 8 hours. The mixture is then heated to 130° C. After the 130° C. have been attained, 13.16 g of a 150N oil, 17.45 g of N-vinylpyrrolidone and 1.46 g of tert-butyl perbenzoate are added. In each case 1 hour, 2 hours and 3 hours thereafter, another 0.73 g each time of tert-butyl perbenzoate is added. The total reaction time is 8 hours. Thereafter the polymer solution of a pour point improver which makes up 7 percent by weight of the total solution is added.

Specific viscosity (20° C. in chloroform): 29 ml/g
Kinematic viscosity at 100° C.: 492 mm$^2$/s
Thickening action (10% of the above product in a 150N oil):
  at 100° C.: 10.97 mm$^2$/s
  at 40° C., 64.3 m$^2$/s
Viscosity index: 164
Residual C12-18-alkyl methacrylate monomer content: 0.24%
Residual MMA monomer content: 22 ppm
Residual N-vinylpyrrolidone monomer content: 0.056%
The graft yield was 55%.

Synthesis of the Polymer Used for Comparison 2 (Polymer Composition II)

A 2 liter four-neck flask equipped with saber stirrer (operated at 150 revolutions per minute), thermometer and reflux condenser is initially charged with 400 g of a 150 N oil and 44.4 g of a monomer mixture consisting of C12-C18-alkyl methacrylates, methyl methacrylate (MMA) and of a methacrylate ester of an iso-C13-alcohol with 20 ethoxylate units in a weight ratio of 87.0/0.5/12.5. The temperature is adjusted to 90° C. After the 90° C. have been attained, 1.75 g of tert-butyl peroctoate are added, and, at the same time, a feed of 555.6 g of a mixture consisting of C12-C18-alkyl methacrylates, methyl methacrylate and of a methacrylate ester of an iso-C13-alcohol with 20 ethoxylate units in a weight ratio of 87.0/0.5/12.5 and also 2.78 g of tert-butyl peroctoate is started. The feeding time is 3.5 hours. The feed rate is uniform. Two hours after the end of feeding, another 1.20 g of tert-butyl peroctoate are added. The total reaction time is 8 hours. Thereafter, the polymer solution of a pour point improver is added, which is then present to an extent of 5 percent by weight. The solution is then diluted with an ethoxylated iso-$C_{13}$-alcohol which contains 3 ethoxylate units in a ratio of 79/21.

Specific viscosity (20° C. in chloroform): 45 ml/g
Kinematic viscosity at 100° C.: 400 mm$^2$/s
Thickening action (10% of the above product in a 150N oil):
  at 100° C.; 11.56 mm$^2$/s
  at 40° C., 63.9 mm$^2$/s
Viscosity index: 178
Residual C12-18-alkyl methacrylate monomer content: 0.59%
Residual MMA monomer content: 48 ppm Comparative Example 1

As comparative example 1, a motor oil formulation of category SAE 5W-30 consisting of a commercial base oil and additives, for example OLOA 4594 (DI package) and Nexbase 3043 as the oil component were mixed and tested in the CEC-L-51-A-98 test.

Oloa 4594 (oronite) is a typical DI additive for motor oils. In addition to ashless dispersants, the product also comprises components for improving the wear performance. The latter components in Oloa 4549 are zinc and phosphorus compounds. Zinc and phosphorus compounds can be regarded as the most common additives at the present time for improving the wear behavior.

The thickener and VI improver used was an ethylene-propylene copolymer (Paratone 8002). Even though their VI action is restricted, ethylene-propylene copolymers are currently the most common VI improvers in passenger vehicle and truck motor oils owing to their outstanding thickening action.

The composition and the test results of the test methods detailed above are shown in Table 1.

Example 1

Comparative example 1 was essentially repeated, except that an inventive polymer composition I was added to the motor oil formulation. In doing so, the thickening action of the polymer composition I was taken into account with a reduced addition of Paratone 8002 in order to retain the viscosity level of the motor oil formulation. The content of Paratone 8002 was thus reduced compared to the formulation of comparative example 1. This inventive formulation was likewise tested in the CEC-L-51-A-98 test.

The composition and the test results of the test methods detailed above are shown in Table 1.

Comparative Example 2

Comparative example 1 was essentially repeated, except that a PAMA polymer of composition 11 was added to the motor oil formulation. With regard to the molecular weight and their oil-thickening action, there is no difference between polymer composition I and II. To prepare the formulation for comparative example 2, thus, merely the 3% by weight of the nitrogen-containing polymer of polymer composition I was exchanged for 3% by weight of the ethoxylate-containing polymer composition II. Such ethoxylated PAMA types of polymer composition 11 have been described as dispersible VI improvers, just like the polymer composition I.

The composition and the test results of the test methods detailed above are shown in Table 1.

TABLE 1

| Component | Comparison 1 SAE 5W-30 | Example 1 SAE 5W-30 | Comparison 2 SAE 5W-30 |
|---|---|---|---|
| Paratone 8002, content (% by wt.) (Viscosity index improver) | 11.5 | 8.5 | 8.5 |
| OLOA 4594, content (% by wt.) (DI package) | 13.2 | 13.2 | 13.2 |
| Nexbase 3043, content (% by wt.) (Base oil) | 75.3 | 75.3 | 75.3 |
| Polymer composition I, content (% by wt.) | None | 3 | None |
| Polymer composition II, content (% by wt.) | None | None | 3 |
| Kinematic viscosity at 100° C. (mm²/s) | 11.38 | 11.56 | 11.91 |
| Mean cam wear (μm), at 100 h | 47.4 | 18.6 | 39.9 |

It was found that the nitrogen-containing polymers have outstanding wear-reducing actions which cannot be explained by virtue of the dispersing action and were not to be expected. N-containing polymers are thus clearly delimited from O-based (ethoxylated) representatives in relation to their advantageous wear protection function.

The invention claimed is:

1. A method for reducing wear in lubricant oil compositions, comprising:
    adding a graft copolymer to at least one lubricant oil;
    wherein the graft copolymer comprises at most 200 ppm of sulfur and the graft copolymer is obtained by a two-stage polymerization, comprising:
    free-radically polymerizing a monomer composition A) to prepare a graft base; and
    graft polymerizing a monomer composition B) on the graft base;
    wherein the monomer composition A) comprises:
        (i) from 0 to 40% by weight, based on the weight of the monomer composition A), of one or more ethylenically unsaturated ester compounds of formula (I)

wherein R is hydrogen or methyl, $R^1$ is a linear or branched alkyl radical having from 1 to 5 carbon atoms, $R^2$ and $R^3$ are each independently hydrogen or a group of the formula —COOR' where R' is hydrogen or an alkyl group having from 1 to 5 carbon atoms,
        (ii) from 60 to 100% by weight, based on the weight of the monomer composition A), of one or more ethylenically unsaturated ester compounds of formula (II)

wherein R is hydrogen or methyl, $R^4$ is a linear or branched alkyl radical having from 6 to 40 carbon atoms, $R^5$ and $R^6$ are each independently hydrogen or a group of the formula —COOR" where R" is hydrogen or an alkyl group having from 6 to 40 carbon atoms, and
        (iii) from 0 to 40% by weight, based on the weight of the monomer composition A), of comonomers,
    wherein the monomer composition B) comprises from 70 to 100% by weight of N-vinyl pyrrolidone,
    wherein the ratio of the weight of the monomer composition A) to the weight of the monomer composition B) is in the range from 99.7:0.3 to 80:20, and
    wherein a graft yield is greater than or equal to (x* $10^{-5}$ mol/g +35)% where x is the weight-average molecular weight of the graft base determined by GPC.

2. The method as claimed in claim 1, wherein a weight-average molecular weight of the graft base is from 5000 to 200 000 g/mol.

3. The method as claimed in claim 1, wherein a specific viscosity $\eta_{sp/c}$ measured in chloroform at 25° C. of the graft base is between 4 and 60 ml/g.

4. The method as claimed in claim 1, wherein a specific viscosity $\eta_{sp/c}$ measured in chloroform at 25° C. of the graft copolymer is between 5 and 40 ml/g.

5. The method as claimed in claim 1, wherein a ratio of the specific viscosity of the graft copolymer to the specific viscosity of the graft base is in the range from 1.01:1 to 1.30:1.

6. The method as claimed in claim 1, wherein a weight-average molecular weight of the graft copolymer is from 5100 to 250 000.

7. The method as claimed in claim 1, wherein a ratio of the weight-average molecular weight of the graft copolymer to the weight-average molecular weight of the graft base is in the range from 1.01:1 to 5:1.

8. The method as claimed in claim 1, wherein a polymerization temperature in the grafting is greater than the polymerization temperature in the free radical polymerization.

9. The method as claimed in claim 1, wherein the free radical polymerization temperature is from 70 to 120° C.

10. The method as claimed in claim 1, wherein the graft polymerization temperature is from 110 to 140° C.

11. The method as claimed in claim 1, wherein from 1 to 9% by weight, based on the weight of the graft base, of N-vinyl pyrrolidone is grafted onto the graft base.

12. The method as claimed in claim 1, wherein the graft copolymer additionally has viscosity index-improving action and/or dispersing action and/or detergent action and/or pour point-depressing action.

13. The method as claimed in claim 1, wherein the method leads to reduced energy consumption.

14. The method as claimed in claim 1, wherein the lubricant mixture further comprises friction modifiers and/or extreme pressure additives which are not graft copolymers as claimed in claim 1.

15. The method as claimed in claim 1, wherein the lubricant oil composition contains 2-20 percent by weight of the graft copolymer.

16. The method as claimed in claim 1, wherein a mean cam wear is at most 40 μm after 100h measured to CEC-L-51-A-98.

17. The method as claimed in claim 1, wherein the lubricant oil composition lubricates internal combustion engines, gearboxes, clutches or pumps.

18. The method as claimed in claim 1, wherein the sulfur content is at most 100 ppm, based on the weight of the graft copolymer.

19. The method as claimed in claim 1, wherein the sulfur content is at most 5 ppm, based on the weight of the graft copolymer.

20. The method as claimed in claim 1, wherein the monomer composition B) comprises from 90 to 100% by weight of N-vinyl pyrrolidone.

* * * * *